United States Patent
Kato et al.

(10) Patent No.: US 10,121,999 B2
(45) Date of Patent: *Nov. 6, 2018

(54) DEGASSING HOLE FORMATION PROCESS AND DEGASSING HOLE FORMATION APPARATUS FOR SECONDARY BATTERY

(71) Applicants: Nissan Motor Co., Ltd., Yokohama-Shi, Kanagawa (JP); Automotive Energy Supply Corporation, Zama-Shi, Kanagawa (JP)

(72) Inventors: Yuzo Kato, Kanagawa (JP); Nobuaki Akutsu, Kanagawa (JP)

(73) Assignees: Nissan Motor Co., Ltd., Yokohama-shi, Kanagawa (JP); Automotive Energy Supply Corporation, Zama-shi, Kanagawa (JP)

( * ) Notice: Subject to any disclaimer, the term of this patent is extended or adjusted under 35 U.S.C. 154(b) by 270 days.

This patent is subject to a terminal disclaimer.

(21) Appl. No.: 15/101,982

(22) PCT Filed: Dec. 3, 2014

(86) PCT No.: PCT/JP2014/082024
§ 371 (c)(1),
(2) Date: Jun. 6, 2016

(87) PCT Pub. No.: WO2015/087760
PCT Pub. Date: Jun. 18, 2015

(65) Prior Publication Data
US 2016/0308181 A1  Oct. 20, 2016

(30) Foreign Application Priority Data

Dec. 11, 2013  (JP) ................................. 2013-255845

(51) Int. Cl.
*H01M 2/02* (2006.01)
*H01M 10/04* (2006.01)
(Continued)

(52) U.S. Cl.
CPC ....... *H01M 2/1223* (2013.01); *H01M 2/0275* (2013.01); *H01M 10/0404* (2013.01);
(Continued)

(58) Field of Classification Search
CPC ................................. H01M 10/0404
(Continued)

(56) References Cited

U.S. PATENT DOCUMENTS 9,722,274 B2 *  8/2017  Akutsu ................. H01M 10/04
2013/0244093 A1 *  9/2013  Min ..................... H01M 2/0287
429/185
2015/0171461 A1  6/2015  Akutsu et al.

FOREIGN PATENT DOCUMENTS

JP  2004342520  * 12/2004  ............ H01M 10/40
JP  2004342520 A  12/2004
(Continued)

*Primary Examiner* — Maria Laios
(74) *Attorney, Agent, or Firm* — Young Basile Hanlon & MacFarlane, P.C.

(57) ABSTRACT

A degassing hole is formed in a casing in which a storage element is housed. Prior to forming the degassing hole, the casing is clamped in a region between the outer peripheral edge of the casing and the storage element where the degassing hole is to be formed such that overlapped films of the casing are pressed tightly together. By displacing the acting position of the clamping force toward the storage element while reducing the clamping force gradually toward the storage element prevent, liquid spill in a degassing process is prevented.

8 Claims, 14 Drawing Sheets

(51) Int. Cl.
  *H01M 2/12*  (2006.01)
  *H01M 10/0525*  (2010.01)
  *H01M 10/0585*  (2010.01)
  *H01M 10/52*  (2006.01)

(52) U.S. Cl.
  CPC ... *H01M 10/0525* (2013.01); *H01M 10/0585* (2013.01); *H01M 10/52* (2013.01); *H01M 2220/20* (2013.01); *Y02E 60/122* (2013.01); *Y02P 70/54* (2015.11)

(58) Field of Classification Search
  USPC .......................................................... 29/730
  See application file for complete search history.

(56) References Cited

FOREIGN PATENT DOCUMENTS

| | | | |
|---|---|---|---|
| JP | 5899316 B2 | 4/2016 | |
| WO | WO-2012074212 A2 * | 6/2012 | .......... H01M 2/0287 |
| WO | 2013187161 A1 | 12/2013 | |

* cited by examiner

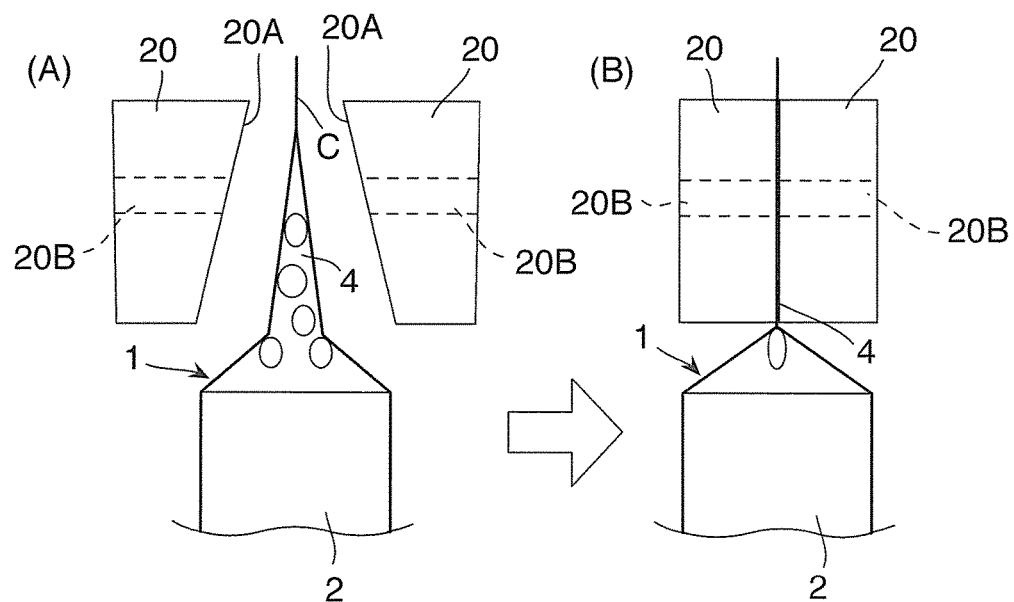
FIG. 14A
FIG. 14B
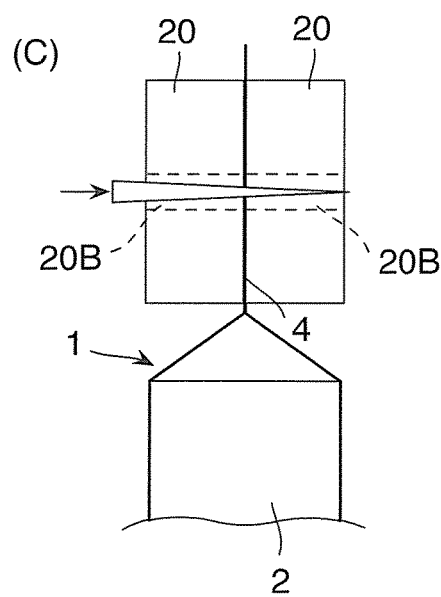
FIG. 14C

DEGASSING HOLE FORMATION PROCESS AND DEGASSING HOLE FORMATION APPARATUS FOR SECONDARY BATTERY

CROSS-REFERENCE TO RELATED APPLICATION(S)

This application claims priority to Japanese patent application 2013-255845 filed on Dec. 11, 2013, incorporated herein in its entirety.

TECHNICAL FIELD

The present invention relates to a manufacturing process and a manufacturing apparatus for manufacturing a secondary battery having a casing formed from a thin, lightweight outer covering film such as a laminate film. More particularly, the present invention relates to the prevention of liquid spill when removing gas generated during a conditioning process or the like.

BACKGROUND

JP2004-342520A, published by the Japan Patent Office in 2004, proposes a secondary battery manufacturing method for manufacturing a secondary battery having a casing constituted by a thin, lightweight outer covering film such as a laminate film, an object thereof being to remove gas generated during conditioning and the like while ensuring that the casing is airtight following removal of the gas.

This conventional technique includes a sealing process in which a storage element is sealed in the interior of the casing constituted by the outer covering film, a degassing process in which gas is removed from the interior of the casing, and a second sealing process. In the sealing process, the casing is clamped by a jig, whereupon the outer covering film is joined apart from a non-joined portion set in a predetermined position of the casing. In the degassing process, a degassing hole is formed in the non-joined portion using a needle or the like while constraining a thickness of the non-joined portion to or below a predetermined thickness using the jig. In the second sealing portion, the degassing hole is closed by joining the non-joined portion.

In general, when the non-joined portion expands or deforms by a large amount due to an increase in internal pressure caused by the generated gas, the non-joined portion may not return to its original shape when joined. Moreover, when the non-joined portion expands, stress may be concentrated on the periphery of the non-joined portion, causing a part of the joined portion to peel back. The processes of the conventional technique described above have the effect of preventing these problems from occurring.

In the degassing process of the conventional technique, in which the gas generated in the casing is discharged to the outside, the degassing hole is formed in the non-joined portion. However, when electrolyte remains in the non-joined portion, the residual electrolyte in the non-joined portion flows to the outside of the casing together with the gas through the degassing hole, leading to a reduction in the amount of electrolyte in the casing. When the electrolyte flowing out of the casing adheres to the surface of the casing, a process for wiping the electrolyte away is required, and as a result, the production cost of the secondary battery may increase.

SUMMARY

It is therefore an object of the present invention to prevent liquid spill reliably when gas is removed from a casing.

In order to achieve the object described above, the present invention provides a degassing hole formation process for a secondary battery manufacturing method, the secondary battery manufacturing method comprising a first sealing process in which outer peripheral edges of overlapped films are joined to form a casing having a joint portion formed on an outer peripheral edge thereof and a storage element is housed in the interior of the casing, a degassing process in which gas in the interior of the casing is discharged to an exterior of the casing, and a second sealing process in which the degassing hole is sealed. The degassing hole formation process comprises forming a degassing hole in a site located between the joint portion on the outer peripheral edge of the casing and the storage element such that the degassing process is performed through the degassing hole, by pressing a region including the site of the casing in which the degassing hole is formed from respective sides of the casing so that the overlapped films are pressed tightly together gradually in a direction approaching the storage element from a position distant from the storage element while reducing a pressing force gradually toward the storage element, and forming the degassing hole in a pressed region.

The details as well as other features and advantages of this invention are set forth in the remainder of the specification and are shown in the accompanying drawings.

BRIEF DESCRIPTION OF DRAWINGS

FIGS. 14A-14C are schematic side views of a degassing hole formation apparatus according to a third embodiment of the present invention.

DESCRIPTION OF THE EMBODIMENTS

A degassing hole formation process and a degassing hole formation apparatus for a secondary battery according to a first embodiment of the present invention will be described below.

Figure 1:
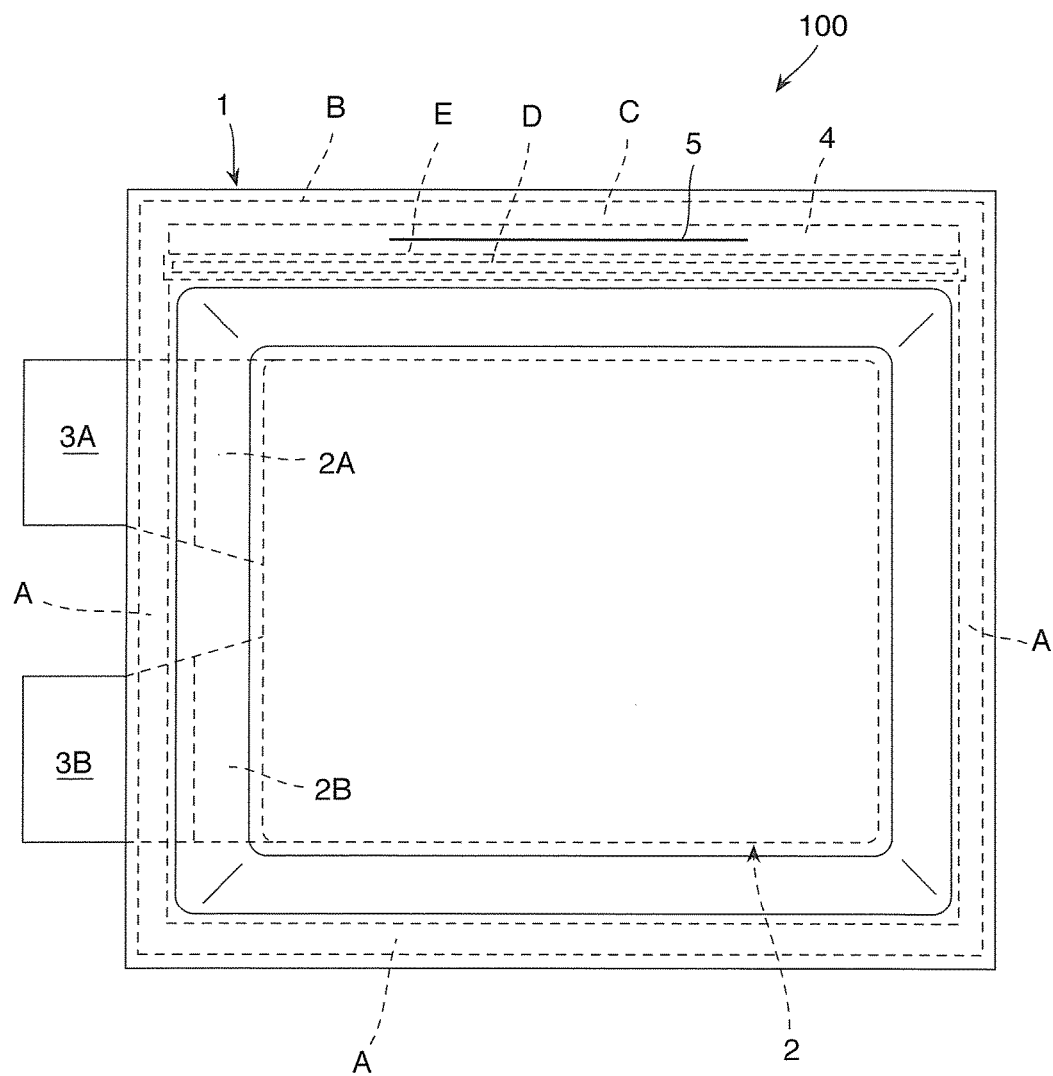
FIG. 1 is a schematic plan view showing a secondary battery to which the present invention is applied.

Referring to FIG. 1 of the drawings, a secondary battery 100 comprises a casing 1 formed by laminating a thin, lightweight outer covering film, and a storage element 2 housed in the casing 1.

The thin, lightweight outer covering film is a polymer/metal composite laminate film having a three-layer structure, for example, which includes a metal layer and polymer resin layers disposed on respective surfaces of the metal layer. The metal layer is formed from metal foil made of aluminum, stainless steel, nickel, copper, for example. The polymer resin layer is formed from a heat-weldable resin film made of polyethylene, polypropylene, modified polyethylene, modified polypropylene, ionomer, ethylene vinyl acetate, for example. The outer covering film can be joined easily by thermal welding or ultrasonic welding, and is preferably airtight and moisture-impermeable.

As shown in the figure, the outer covering film is formed into a bag shape while housing the storage element 2 of the secondary battery by joining fused portions A in three peripheral edge locations by thermal welding. In this condition, an electrolyte is injected into the interior of the bag, whereupon an opening portion B is joined by thermal welding, thereby forming the casing 1. The opening portion B is joined by thermal welding in three stages, namely a stage for forming a first seal portion C in a first sealing process, and stages for forming a second seal portion D and a main seal portion E respectively in a second sealing process and a main sealing process, as will be described below.

The storage element 2 of the secondary battery will now be described briefly, using a lithium ion secondary battery as an example. The storage element 2 of the lithium ion secondary battery is formed by overlapping a positive electrode and a negative electrode via a separator. More specifically, the storage element 2 is formed by laminating a positive electrode plate constituted by a collector coated with a positive electrode active material layer and a negative electrode plate constituted by a collector coated with a negative electrode active material layer via a separator. A lithium ion secondary battery is a non-aqueous battery, and therefore gas is generated when the battery reacts with moisture that intermixes with the battery during manufacture. Gas is also generated when an organic solvent contained in the electrolyte evaporates, and in response to an electrolyte reaction during conditioning following manufacture of the battery.

The positive electrode plate comprises, for example, a collector formed from aluminum foil and a positive electrode active material layer formed on respective surface regions of the collector, excluding tab regions. The figure shows only one tab region 2A extending to the outside of the storage element 2. The positive electrode active material layer includes, for example, a positive electrode active material constituted by a lithium/transition metal composite oxide such as $LiMn_2O_4$, a conduction aid, and a binder.

The negative electrode plate comprises, for example, a collector formed from copper foil and a negative electrode active material layer formed on respective surface regions of the collector, excluding tab regions. The figure shows only one tab region 2B extending to the outside of the storage element 2. The negative electrode active material layer includes a negative electrode active material, a conduction aid, and a binder. The negative electrode active material is hard carbon (a non-graphitizable carbon material), a graphite-based carbon material, or a lithium/transition metal composite oxide, for example.

The separator is formed from a polyolefin such as polyethylene or polypropylene, polyamide, or polyimide, for example.

The liquid electrolyte (the electrolyte) contains an organic solvent, a supporting electrolyte, and so on. The organic solvent is a cyclic carbonate such as propylene carbonate (PC) or ethylene carbonate (EC), a chain carbonate such as dimethyl carbonate, or an ether such as tetrahydrofuran, for example. The supporting electrolyte is an inorganic anion salt such as lithium salt ($LiPF_6$) or an organic anion salt such as $LiCF_3SO_3$.

The tab region 2A of each storage element 2 is connected to a positive electrode terminal 3A. The tab region 2B of each storage element 2 is connected to a negative electrode terminal 3B. The positive electrode terminal 3A and the negative electrode terminal 3B are led to the outside of the casing 1 through the fused portion A of the casing 1.

Referring to FIGS. 2A-2D, a secondary battery manufacturing process, to which a degassing hole formation method and a degassing hole formation apparatus according to the present invention are applied, will now be described. The secondary battery manufacturing process mainly includes a sealing process, a conditioning process, a degassing/second sealing process, a main sealing/trimming process, and other processes as required.

Figure 2A:
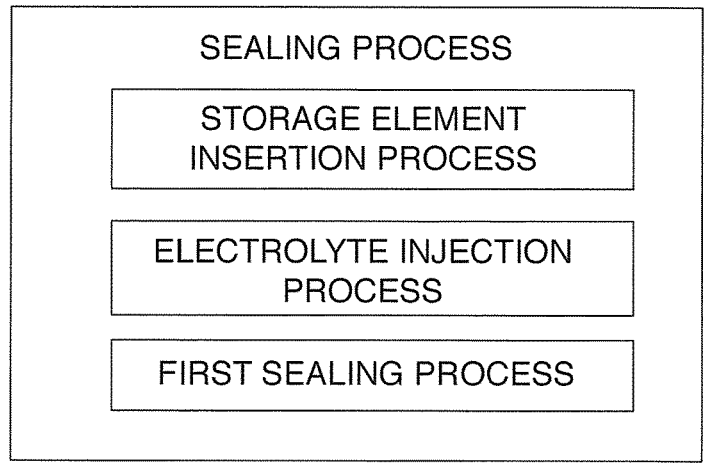
FIGS. 2A-2D are diagrams illustrating processes for manufacturing the secondary battery.

The sealing process shown in FIG. 2A is constituted by a storage element insertion process, an electrolyte injection process, and the first sealing process.

In the storage element insertion process, the rectangular storage element 2 is disposed between either two substantially rectangular outer covering films or an outer covering film folded in two. The positive electrode terminal 3A and the negative electrode terminal 3B of the storage element 2 are positioned so as to extend to the outside of the outer covering film. The fused portions A in three locations on the peripheral edge of the outer covering film shown in FIG. 1 are joined by thermal welding. The remaining side of the peripheral edge is left as the opening portion B. As a result, the bag-shaped casing 1 is formed.

In the electrolyte injection step, the electrolyte is injected into the casing 1 through the opening portion B. There are no particular limitations on a method of injecting the electrolyte. The electrolyte may be injected directly by inserting a tube or a nozzle into the opening portion B, or the electrolyte may be injected into the casing 1 by submerging the casing 1 in the electrolyte.

In the first sealing process, the opening portion B used to inject the electrolyte is joined by thermal welding, thereby forming the first seal portion C. As shown in FIG. 1, the first seal portion C is set near the peripheral edge of the casing 1. In other words, the first seal portion C is joined in a position far from the storage element 2. A space between the first seal portion C of the casing 1 and the storage element 2 communicates with the storage element 2, and this space is used as a degassing portion 4.

Figure 2B:
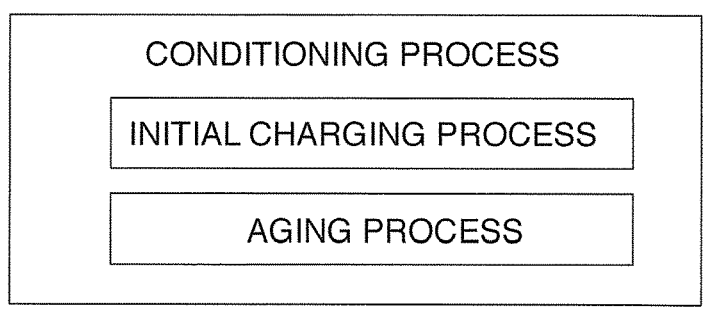

The conditioning process shown in FIG. 2B is constituted by an initial charging process, and an aging process for stabilizing a battery characteristic. In the initial charging process, initial gas is generated by the storage element 2. Gas is also generated by the storage element 2 in the aging process. Depending on the application of the secondary battery, the conditioning process may be constituted by the initial charging process or the aging process alone.

In the initial charging process, the charging element 2 is charged until the charging element 2 generates a battery voltage obtained when the charging element 2 is charged up to a predetermined proportion of a battery capacity thereof, for example when the charging element 2 is fully charged. As regards a temperature environment of the initial charging process, the amount of generated gas may be insufficient below 45° C., and above 70° C., the battery characteristic may deteriorate. Therefore, a range of 45° C. to 70° C. is preferable as the temperature environment in which to perform the initial charging process. The predetermined proportion of the battery capacity is set as required.

In the aging process, the storage element 2 is maintained in a charged condition for a predetermined period.

Figure 2C:
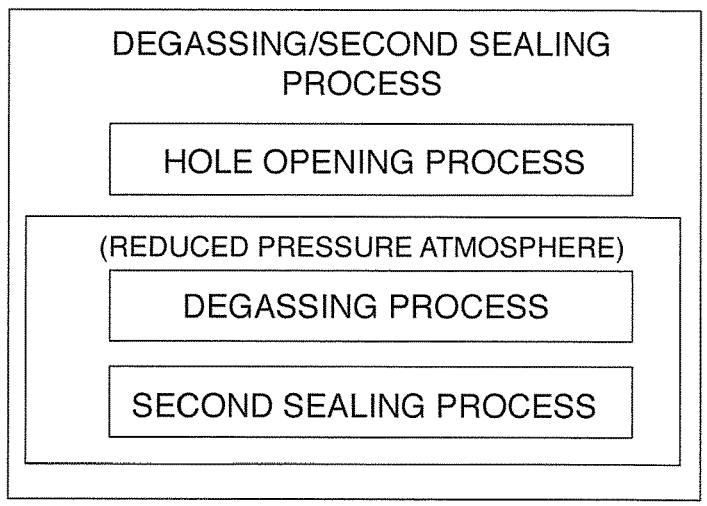

The degassing/second sealing process shown in FIG. 2C is constituted by a hole opening process, a degassing process, and the second sealing process. The hole opening process is implemented in a dry gas atmosphere using dry air, an inert gas, or the like at atmospheric pressure. The degassing process and the second sealing process are implemented in a reduced pressure atmosphere.

In the hole opening process, a slit-shaped degassing hole 5 is formed by inserting a cutout into the degassing portion 4, as shown in FIG. 1. As a result, the degassing portion 4 communicates with the outside.

In the degassing process, gas that has dissolved into the electrolyte in the casing 1 is separated from the electrolyte and discharged to the outside through the degassing hole 5 by creating a reduced pressure atmosphere. The degassing process is continued until a predetermined time set in advance elapses.

Following completion of the degassing process, the second sealing process is performed. Here, the second seal portion D shown in FIG. 1 is formed by forming a joint through thermal welding in a site of the casing 1 closer to the storage element 2 than the first seal portion C while maintaining the reduced pressure atmosphere.

Figure 2D:
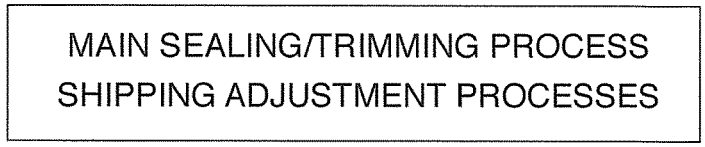

In the main sealing/trimming process shown in FIG. 2D, the secondary battery, having undergone the second sealing process, is extracted from the reduced pressure atmosphere, whereupon a joint is formed on the casing 1 between the first seal portion C and the second seal portion D over a wider area than the second seal portion D by thermal welding. As a result, a main seal portion E shown in FIG. 1 is formed. Next, the trimming process is implemented to cut away unnecessary regions of the peripheral edge part of the casing 1. Shipping adjustment processes such as a scanning process and a charging/discharging process are then implemented, whereby the secondary battery is completed.

The manufacturing process described above is a typical secondary battery manufacturing process, and the secondary battery manufacturing method to which the embodiments of the present invention are applied adheres to this process.

Next, referring to FIGS. 15A-15C, a typical hole opening process will be described in more detail.

When the hole opening process of the degassing/second sealing process is performed as shown in FIG. 2C, the electrolyte may remain in the degassing portion 4 together with the gas. In FIG. 15A, the degassing portion 4 is swollen due to an increase in the internal pressure of the casing 1 caused by the gas. When, in this condition, the degassing portion 4 is cut open using a cutter 14, as shown in FIG. 15B, the electrolyte may fly out of the degassing portion 4 and scatter together with the gas. When the amount of electrolyte in the casing 1 decreases as a result, the lifespan of the battery may be affected.

Figure 15A:
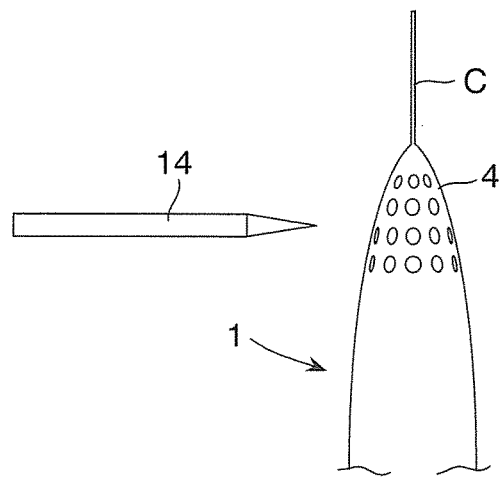
FIGS. 15A-15C are schematic sectional views and a plan view of the main parts of the secondary battery, illustrating electrolyte leakage accompanying formation of the degassing hole in the casing.
Figures 15B, 15C:
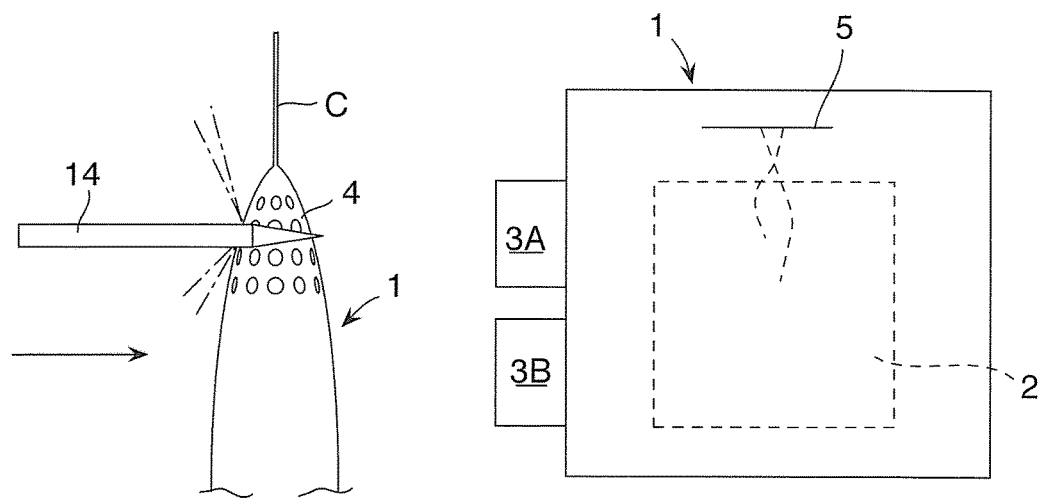

As shown in FIG. 15C, the electrolyte that flies out of the casing 1 adheres to the surface of the casing 1. When the electrolyte adheres to the surface of the casing 1, a new wiping process must be provided, leading to an increase in production cost. Further, when the electrolyte is not fully wiped away, an adhesion force of an adhesive used to adhere respective side faces of a plurality of secondary batteries 100 to each other in order to form a battery pack may decrease.

Figure 3:
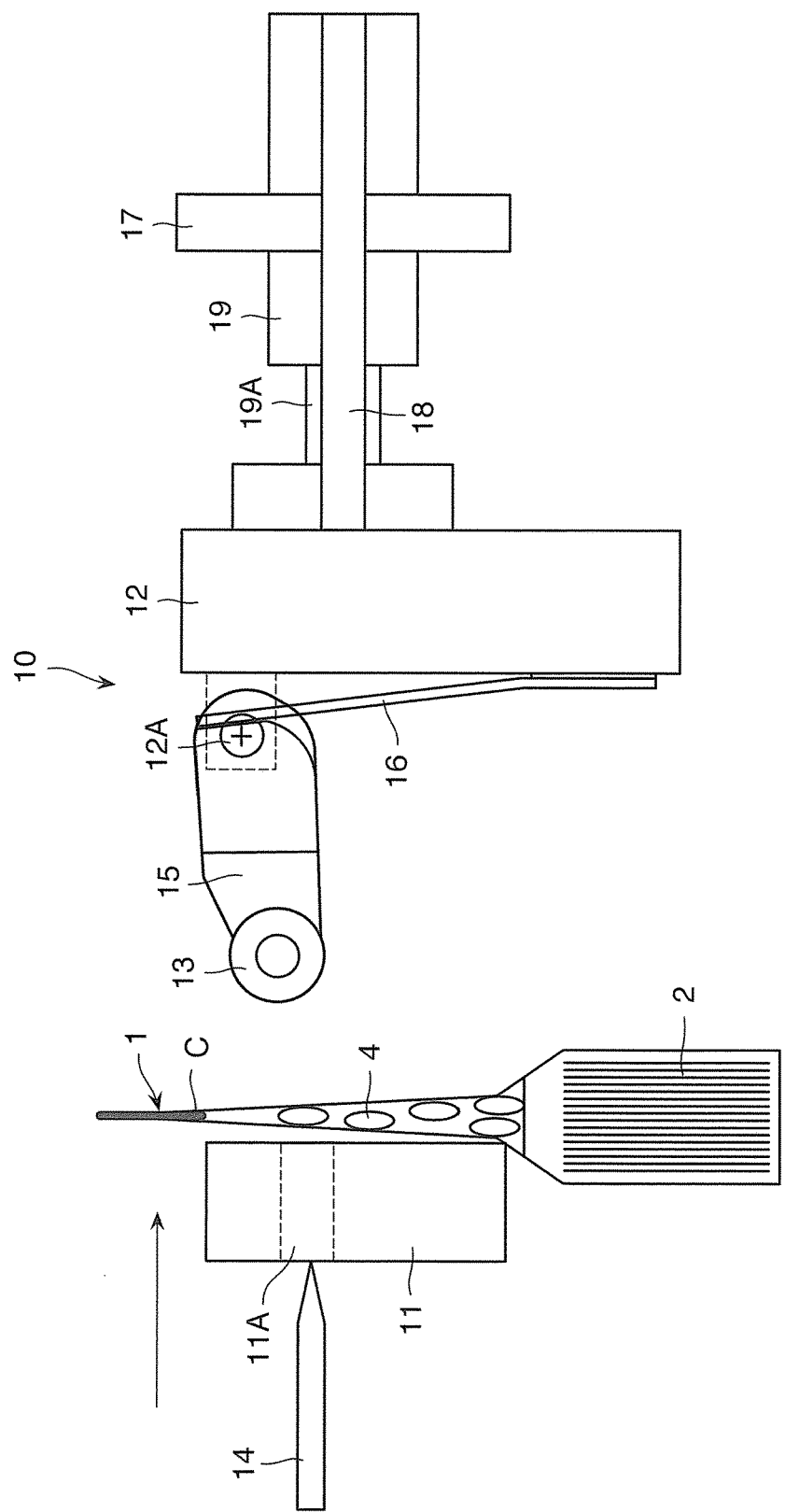
FIG. 3 is a side view of a degassing hole formation apparatus according to a first embodiment of the present invention.
Figure 4:
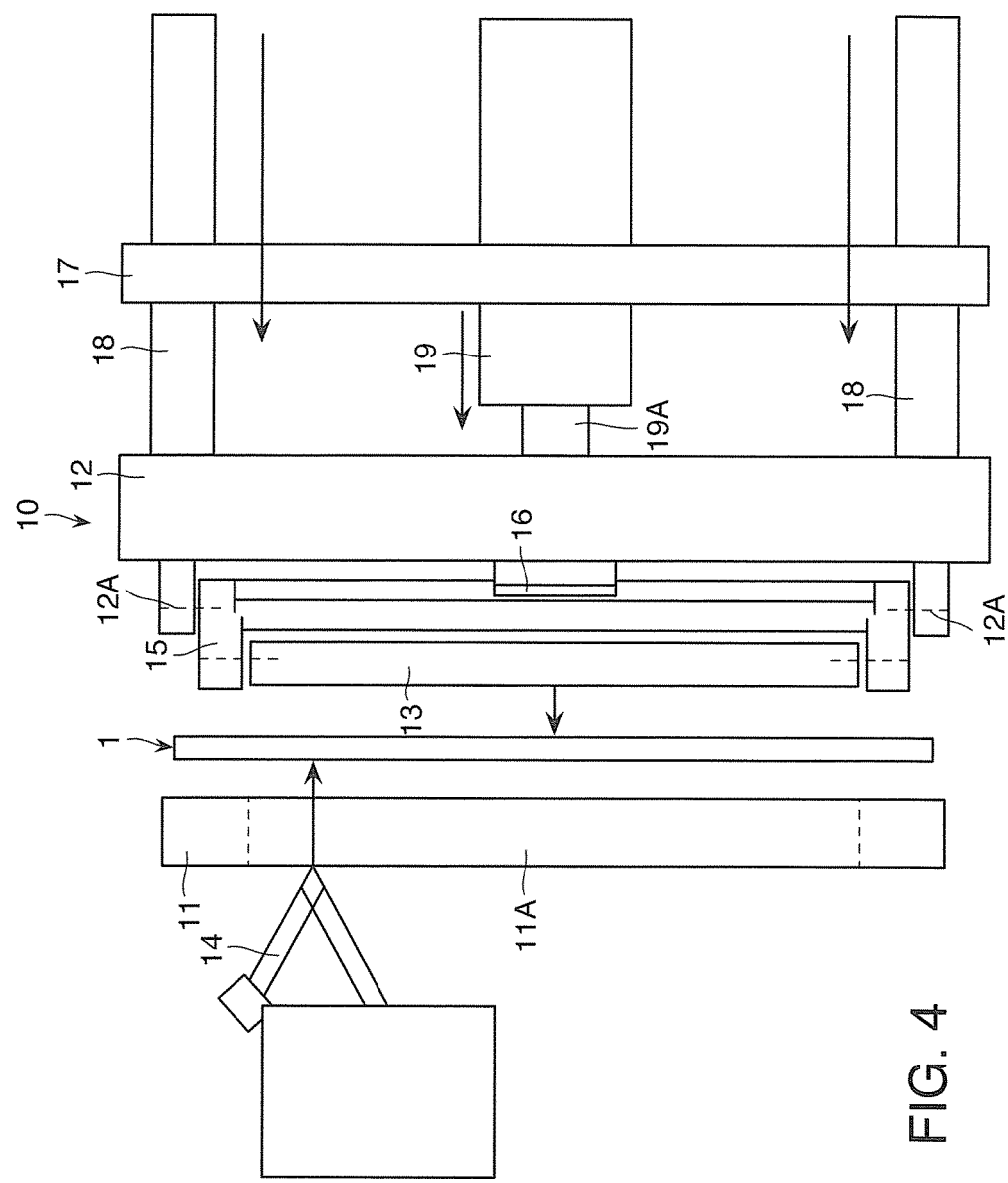
FIG. 4 is a plan view of the degassing hole formation apparatus.

In this embodiment, a degassing hole formation apparatus 10 shown in FIGS. 3 and 4 is used to prevent the electrolyte from flying out of the casing 1 during the hole opening process. The degassing hole formation apparatus 10 comprises a clamping mechanism constituted by a support member 11 that supports one surface of the degassing portion 4 of the casing 1, a roller 13 that contacts another surface of the degassing portion 4, and a moving body 12 that supports the roller 13 via a swingable arm 15. The degassing hole formation apparatus 10 also includes the cutter 14 for forming the degassing hole 5 by inserting a cutout in the degassing portion 4.

Referring to FIG. 3, the support member 11 and the moving body 12 are configured to be capable of moving between a standby position removed from the degassing portion 4 of the casing 1, and an operating position in which the support member 11 and the moving body 12 approach each other so as to clamp the degassing portion 4. In the following description, a movement direction from the standby position to the operating position will be referred to as advancement, and a movement direction from the operating position to the standby position will be referred to as retreat. Further, a horizontal direction that is orthogonal to these directions, or in other words a transverse direction of the plan view shown in FIG. 4, will be referred to as a transverse direction.

The moving body 12 comprises integral auxiliary shafts 18 that extend in a front-rear direction from respective transverse direction ends thereof and are guided by a base member 17 so as to be free to slide. Further, the moving body 12 is joined to a tip end of a rod 19A that performs a telescopic motion while projecting from a cylinder 19 fixed to the base member 17. With this structure, the moving body 12 moves between the standby position and the operating position in accordance with the telescopic motion of the rod 19A while being guided by the auxiliary shafts 18. The support member 11 moves in the advancement direction between the standby position and the operating position by means of a similar support structure, not shown in the figures, to that of the moving body 12.

In the operating position, the support member 11 contacts one surface of the degassing portion 4 of the casing 1 so as to support the degassing portion 4 from one direction. A through hole 11A is formed in the support member 11 from a lateral direction slit, and a cutting blade of the cutter 14 penetrates the through hole 11A so as to project from a front surface of the support member 11. A width of the through hole 11A is set so that even when the electrolyte adheres thereto, the electrolyte does not remain therein.

The cutter 14 is configured to be positioned behind the support member 11 when the support member 11 is in the standby position, and to be capable of penetrating the through hole 11A in the support member 11 such that a cutting edge thereof projects frontward from the support member 11 when the support member 11 is in the operating position. Furthermore, the cutter 14 is configured such that the cutting edge thereof is capable of performing a lateral movement in the transverse direction within the through hole 11A when the cutter 14 penetrates the through hole 11A. A thickness of the cutter 14 is set so that the cutter 14 can pass through the through hole 11A. As a result, the degassing hole 5 can be formed in the degassing portion 4 of the casing 1 within a range in which the support member 11 supports the degassing portion 4.

The roller 13 clamps the degassing portion 4 of the casing 1 together with the support member 11 by contacting the other surface of the degassing portion 4. As shown in FIG. 3, the roller 13 is supported to be free to rotate on a tip end of the arm 15. A base end of the arm 15 is coupled to the moving body 12 to be free to swing via a shaft 12A. A tip end of a plate spring 16, a base portion of which is fixed to the moving body 12, contacts a base end surface of the arm 15 by surface contact. The plate spring 16 applies a spring load to the arm 15 so that a rotation position of the arm 15, or in other words a vertical direction swinging angle position of the roller 13, is maintained elastically in a predetermined initial position shown in FIG. 3. In this initial position, the arm 15 is rotated to an uppermost position, and the roller 13 projects frontward from the moving body 12 by a maximum amount.

The roller 13 is disposed in a position offset from a central axis of the arm 15 so that in the initial position, the vertical direction swinging angle position of the roller 13 is lower than the position of the base end side shaft 12A of the arm 15. In FIG. 3, for example, the roller 13 is disposed on a plane corresponding to a position of a tip end of the arm 15 that has rotated two or three degrees downword from a horizontal plane that includes the shaft 12A. The roller 13 supported in this offset position contacts the degassing portion 4 of the casing 1 when the moving body 12 advances to the operating position, and is thereby biased downward. As a result, the roller 13 rolls downward, thereby stroking the degassing portion 4 while causing the tip end of the arm 15 to rotate downward. When the tip end of the arm 15 rotates downward, the contact condition in which the plate spring 16 contacts the base end surface of the arm 15 changes from a surface contact condition to a point contact condition in which the plate spring 16 contacts an arc portion formed below the base end surface. As a result, a moment generated around the shaft 12A acts on the arm 15 as a restoring force for returning the arm 15 to the initial position.

In this embodiment, the hole opening process is executed as follows.

The secondary battery, having undergone the conditioning process shown in FIG. 2B, is set in the degassing hole formation apparatus 10 in which the support member 11, the moving body 12, and the cutter 14 are all in their respective standby positions. In this condition, as shown in FIG. 3, the support member 11 advances from the standby position to the operating position. The support member 11 contacts one surface of the degassing portion 4 so as to support the degassing portion 4.

In the casing 1 of the secondary battery that has completed the conditioning process, the degassing portion 4 is slightly swollen, as shown in FIG. 15A, due to an increase in internal pressure caused by the gas generated during the conditioning process. Further, as shown by ellipses in the figure, the electrolyte remains in the degassing portion 4. It should be noted that the swelling itself is not directly related to the description of the hole opening process, and therefore the degassing portion 4 is illustrated in a non-swollen condition on the side views of the degassing hole formation apparatus shown in FIGS. 3 and 5-7.

Figure 5:
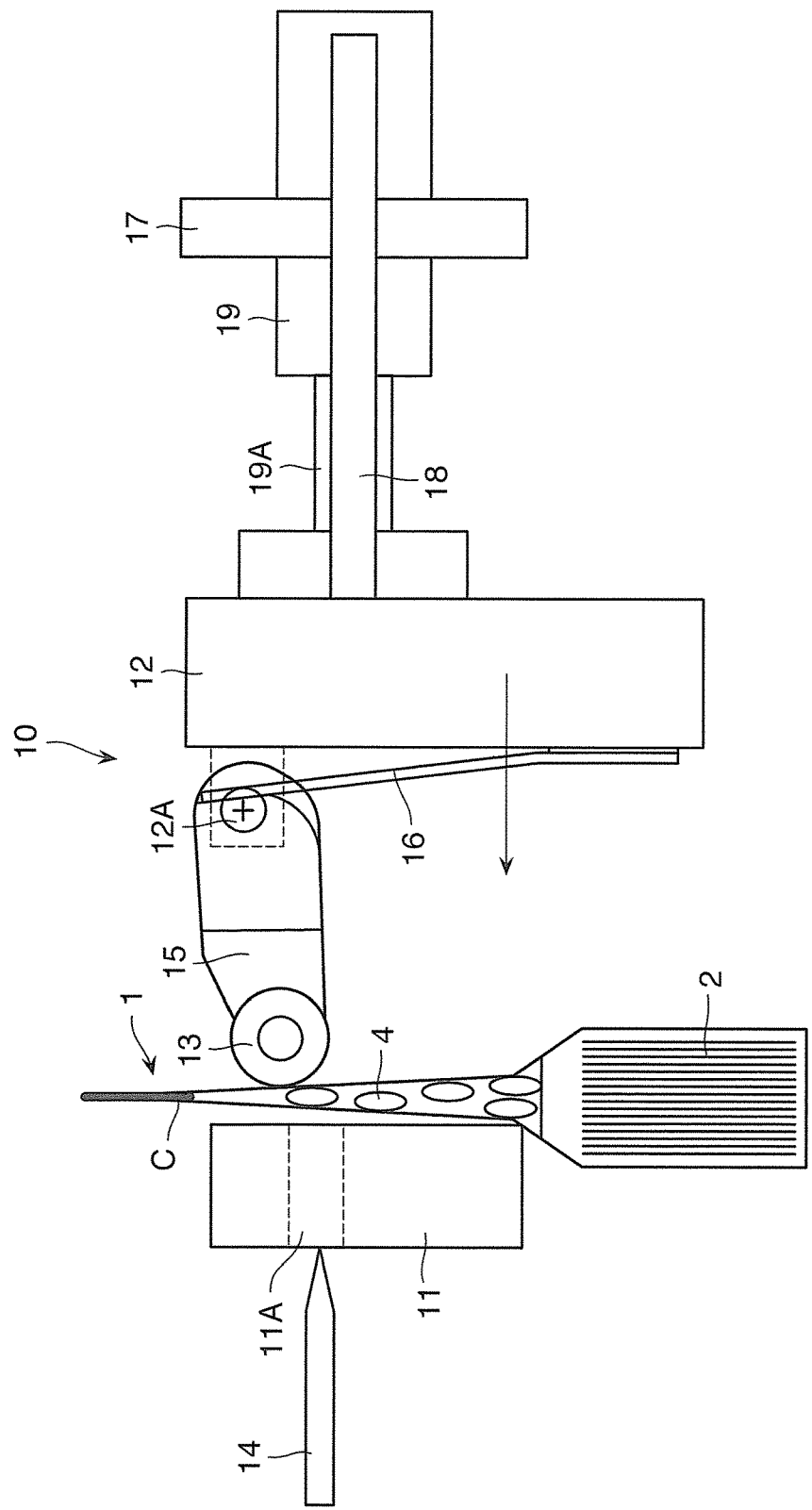
FIG. 5 is a side view of the degassing hole formation apparatus in an operative condition.

Referring to FIG. 5, with the support member 11 supporting one surface of the degassing portion 4, the degassing hole formation apparatus 10 causes the moving body 12 to advance from the standby position to the operating position. When the moving body 12 advances, the roller 13 initially contacts a part of the degassing portion 4 removed from the storage element 2. The roller 13 clamps the slightly swollen degassing portion 4 of the casing 1 together with the support member 11.

Figure 6:
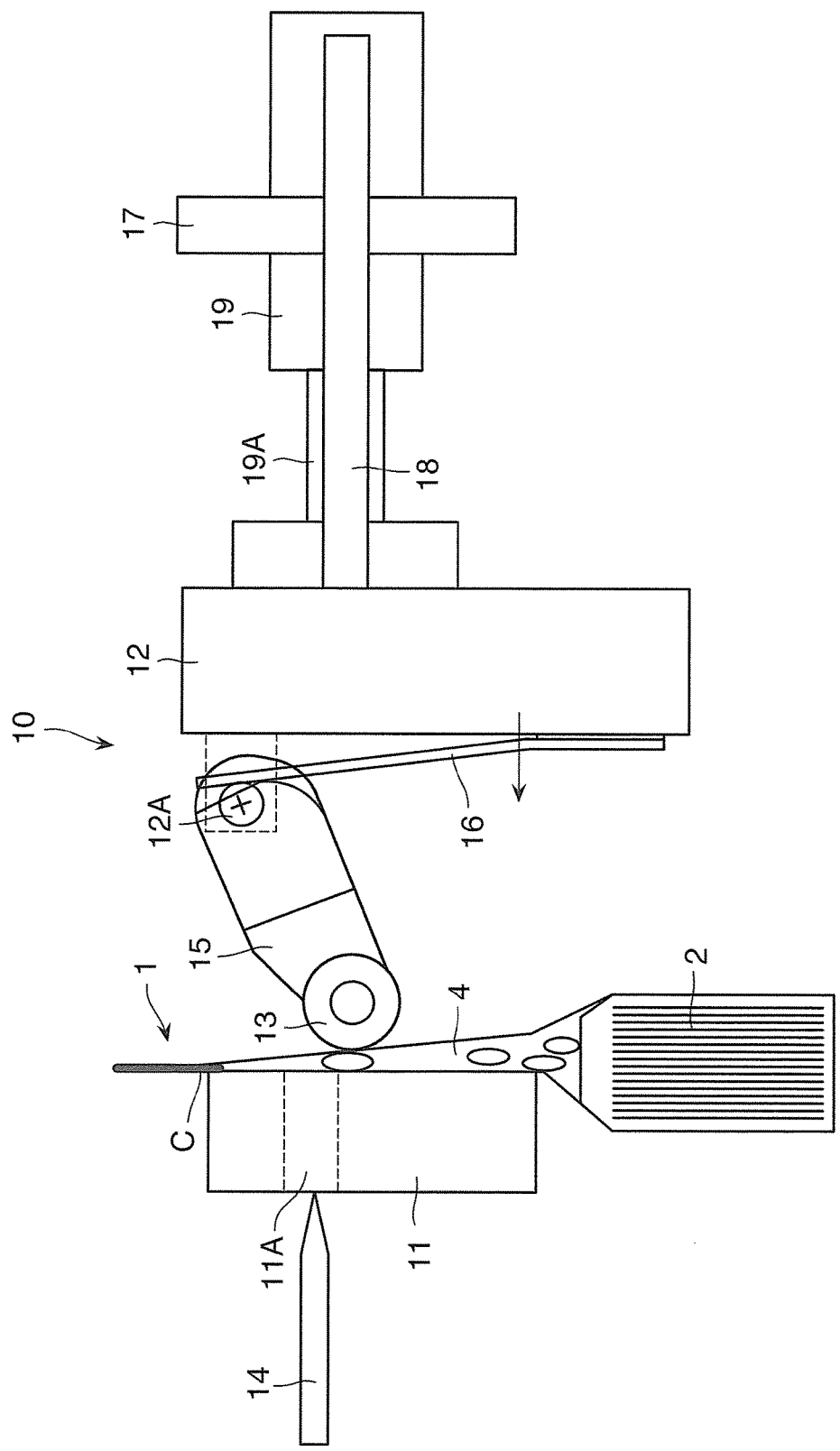
FIG. 6 is a side view of the degassing hole formation apparatus, illustrating an operation to clamp a casing.

Referring to FIG. 6, when the moving body 12 advances further, the tip end of the arm 15 starts to rotate downward such that the roller 13 rolls downward against the plate spring 16, thereby stroking the degassing portion 4 while causing the arm 15 to rotate downward. As a result, as shown in FIG. 6, the roller 13 on the tip end of the arm 15 moves downward in the figure toward the storage element 2 while rolling along the surface of the degassing portion 4. Thus, the roller 13 operates so as to stroke the slightly swollen degassing portion 4 of the casing 1 in the direction of the storage element 2.

Figure 7:
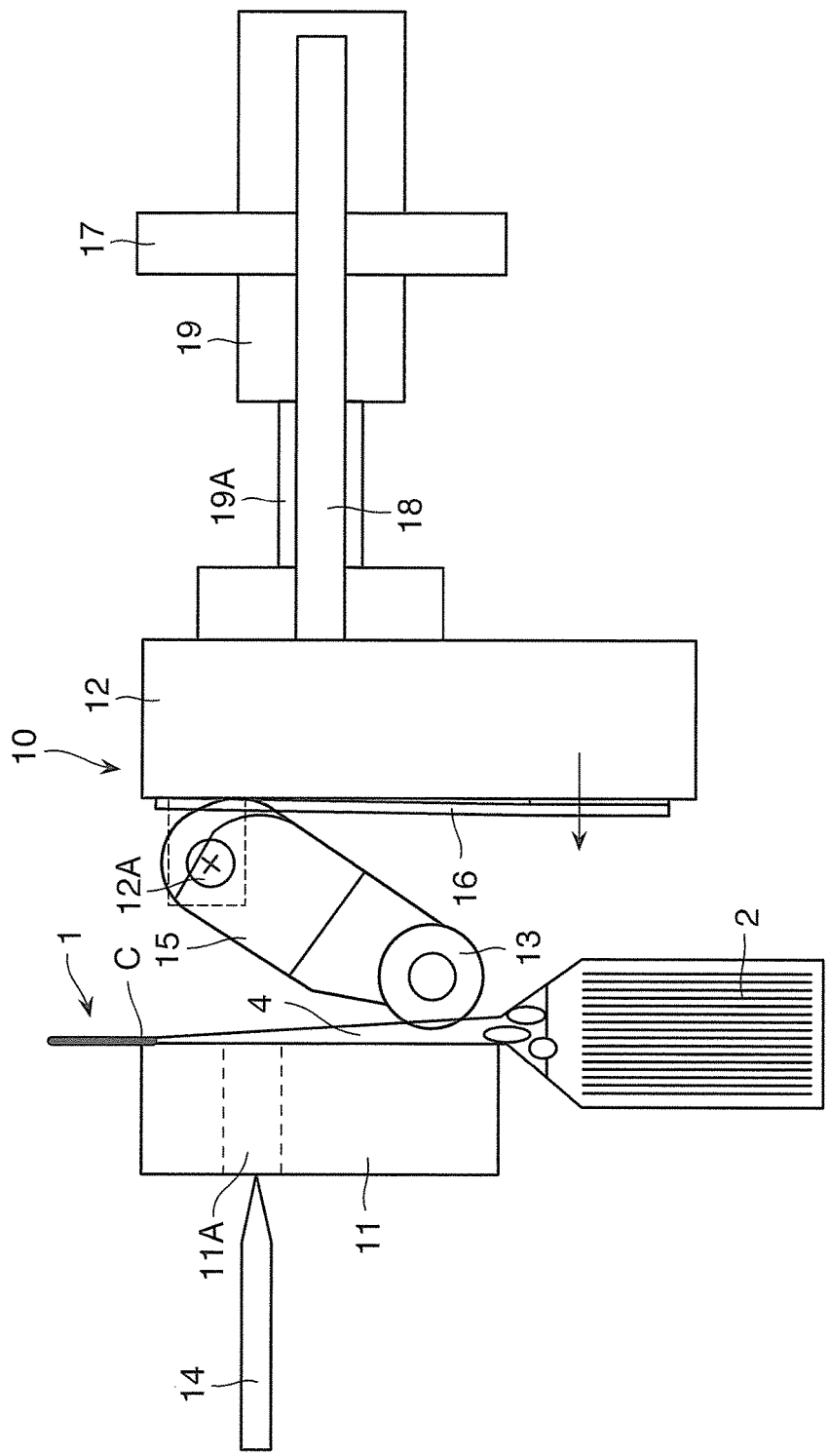
FIG. 7 is a side view of the degassing hole formation apparatus, illustrating a condition in which the operation to clamp the casing is complete.

Referring to FIG. 7, when the roller 13 reaches a lowermost end, the degassing portion 4 is completely flattened between the support member 11 and the roller 13, and therefore the electrolyte remaining in the degassing portion 4 drips down into the storage element 2. The electrolyte that drips down intermixes with electrolyte on the periphery of the storage element 2, thereby promoting gas-liquid separation of the gas and the electrolyte.

Figure 10A:
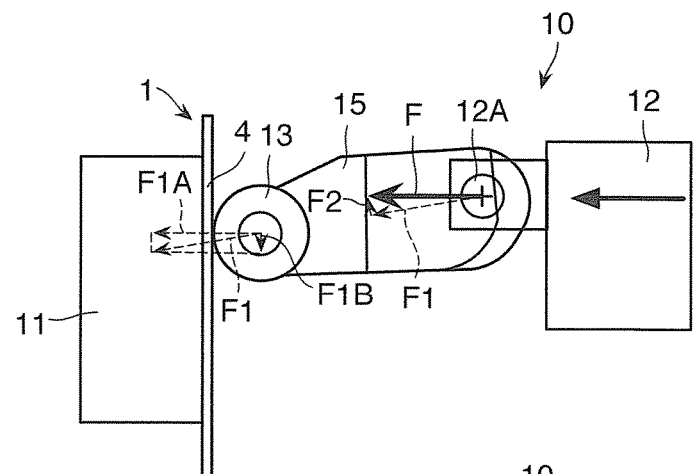
FIGS. 10A-10C are side views of main parts of the degassing hole formation apparatus, illustrating variation in a clamping force exerted on the casing.
Figure 10B:
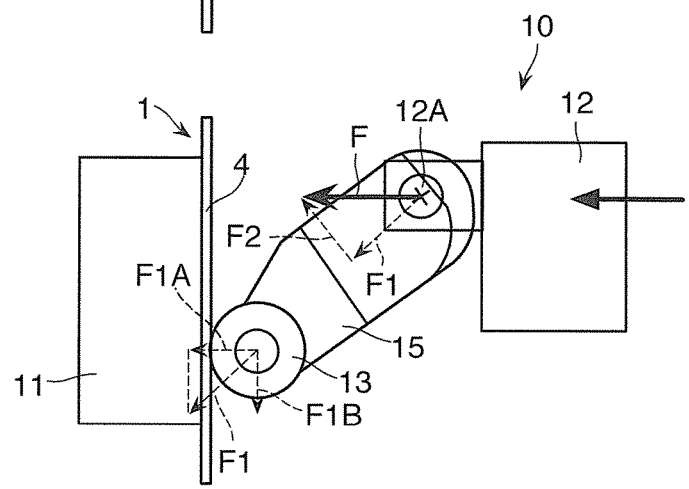
Figure 10C:
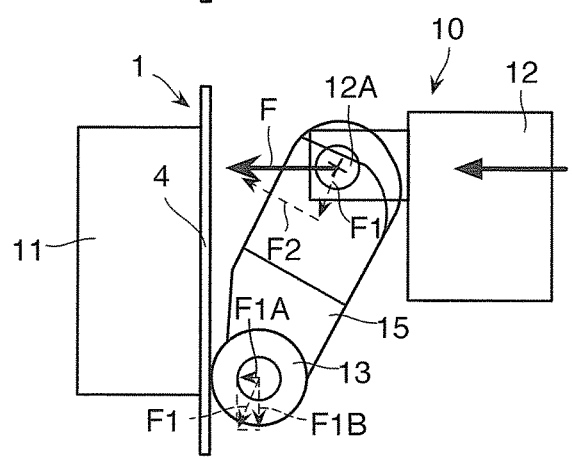

Referring to FIGS. 10A-10C, in this embodiment, a pressing force exerted by the roller 13 on the degassing portion 4 during the stroking operation performed on the degassing portion 4 by the roller 13 decreases steadily as the roller 13 approaches the storage element 2 from a site located far from the storage element 2. In other words, a pressing force F generated by advancement of the moving body 12 is divided into a component force F1 transmitted from the shaft 12A to the arm 15 in the direction of the arm 15, and a component force F2 acting in an orthogonal direction to the arm 15. Of these component forces, the component force F1 acts on the roller 13 in the direction of the arm 15. When the component force F1 acts on the roller 13, the roller 13 divides the component force F1 into a component force F1A serving as a pressing force applied in a direction for pressing the degassing portion 4, and a component force F1B that biases the roller 13 downward. The roller 13 moves downward in response to the latter.

As shown in FIG. 10A, when the roller 13 is in contact with the site of the degassing portion 4 located far from the storage element 2, a majority of the component force F1 acting on the roller 13 forms the pressing force F1A that is exerted on the degassing portion 4. Accordingly, the roller 13 strokes the degassing portion 4 downward by the comparatively large pressing force F1A. As a result, the electrolyte remaining in the degassing portion 4 is reliably transmitted toward the storage element 2 together with the gas intermixed therewith.

As shown in FIG. 10B, when the roller 13 approaches the storage element 2, the component force F1 that is exerted on the roller 13 via the arm 15 in response to the pressing force F applied in the advancement direction of the moving body 12 decreases in proportion with an angle by which the arm 15 inclines relative to a planar direction. Accordingly, the component force F1A that serves as the pressing force exerted on the degassing portion 4 by the roller 13 likewise decreases gradually in proportion with the angle by which the arm 15 inclines relative to the planar direction. Hence, as the roller 13 moves so as to stroke the degassing portion 4 downward while approaching the storage element 2, the component force F1A gradually decreases. As a result, the electrolyte remaining in the degassing portion 4 can be reliably returned to the storage element 2 side of the casing 1 together with the gas intermixed therewith.

As shown in FIG. 10C, when the roller 13 approaches the storage element 2 even further, the component force F1 that is exerted on the roller 13 via the arm 15 in response to the pressing force F applied in the advancement direction of the moving body 12 decreases further in proportion with the angle by which the arm 15 inclines relative to the planar direction. Accordingly, the component force F1A that serves as the pressing force exerted on the degassing portion 4 by the roller 13 likewise decreases further in proportion with the angle by which the arm 15 inclines relative to the planar direction. Hence, as the roller 13 approaches the storage element 2, the component force F1A that serves as the pressing force exerted on the degassing portion 4 decreases further.

It should be noted that a return moment also acts on the arm 15 so as to return the arm 15 to the initial position set by the plate spring 16. This return moment acts to press the roller 13 against the degassing portion 4 via the arm 15. However, the return moment is far smaller than an external force acting on the arm 15, for example a force that acts on the roller 13 as the moving body 12 advances to the operating position. In other words, the spring load of the plate spring 16 is set such that when the arm 15 is freed after being released from exertion of the external force generated by advancement of the moving body 12, the arm 15 can be rotated to the initial position. Therefore, the component force F1A that serves as the pressing force exerted on the degassing portion 4 by the roller 13 can be set as described above without taking into consideration the return moment generated by the plate spring 16.

Figure 11:
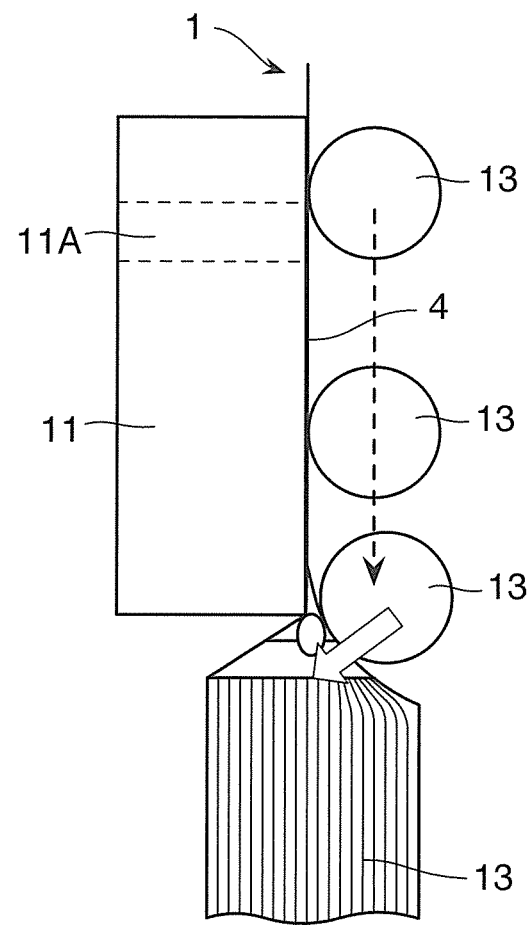
FIG. 11 is a side view of the main parts of the degassing hole formation apparatus, illustrating variation in an application position of the clamping force exerted on the casing.

Referring to FIG. 11, when the roller 13 is pressed forcefully against the degassing portion 4 in the vicinity of the storage element 2, tension may be applied to the outer covering film of the casing 1 that houses the storage element 2 and is connected to the degassing portion 4, and as a result, the storage element 2 may be deformed within the casing 1. According to this embodiment, however, the component force F1A that serves as the pressing force exerted on the degassing portion 4 by the roller 13 decreases as the roller 13 approaches the storage element 2. Therefore, a situation in which tension is applied to the outer covering film of the casing 1 housing the storage element 2 such that the storage element 2 inside the casing 1 is deformed can be prevented.

Figure 8:
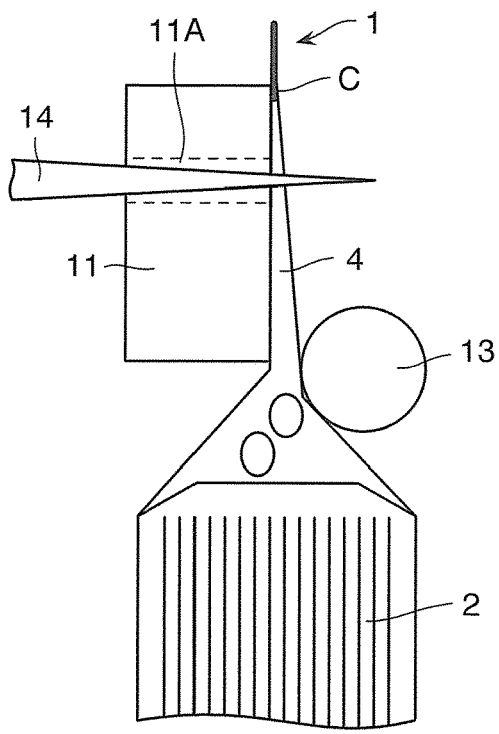
FIG. 8 is a side view of the degassing hole formation apparatus, illustrating a hole opening operation.
Figure 9:
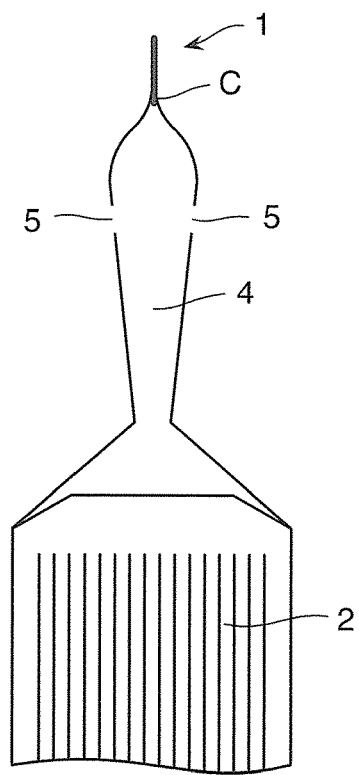
FIG. 9 is a longitudinal sectional view, showing main parts of the secondary battery when a degassing hole is formed therein.

Referring to FIG. 8, when the stroking operation performed by the roller 13 on the degassing portion 4 is complete, the cutter 14 is operated such that the cutting edge of the cutter 14 is pushed through the through hole 11A in the support member 11 to the operating position, in which the cutting edge inserts a cutout into the degassing portion 4 of the casing 1. Next, the cutting edge moves in the transverse direction of the slit-shaped through hole 11A in the support member 11 so as to cut open the degassing portion 4 in the transverse direction, and as a result, as shown in FIG. 9, the degassing hole 5 is formed in the degassing portion 4. After forming the degassing hole 5, the cutter 14 retreats to the rear of the support member 11 so as to return to the standby position. The support member 11 and the moving body 12 are also returned to the standby position.

As described above, the outer covering film of the degassing portion 4 is clamped by the roller 13 and the support member 11, and then stroked downward toward the storage element 2. As a result, the electrolyte can be removed entirely from the degassing portion 4. The degassing hole 5 is formed in this condition. Hence, as the support member 11 and the moving body 12 retreat to the standby position, the gas in the casing 1 on the periphery of the storage element 2 pushes open the degassing portion 4, as shown in FIG. 9, and is then discharged to the outside of the casing 1 through the degassing hole 5. Further, as a result of the stroking operation of the roller 13, the electrolyte that drips down around the periphery of the storage element 2 through the degassing portion 4 intermixes with the electrolyte on the periphery of the storage element 2. As a result, no electrolyte flows out through the degassing hole 5 either during or after formation of the degassing hole 5 in the degassing portion 4.

Figure 12:
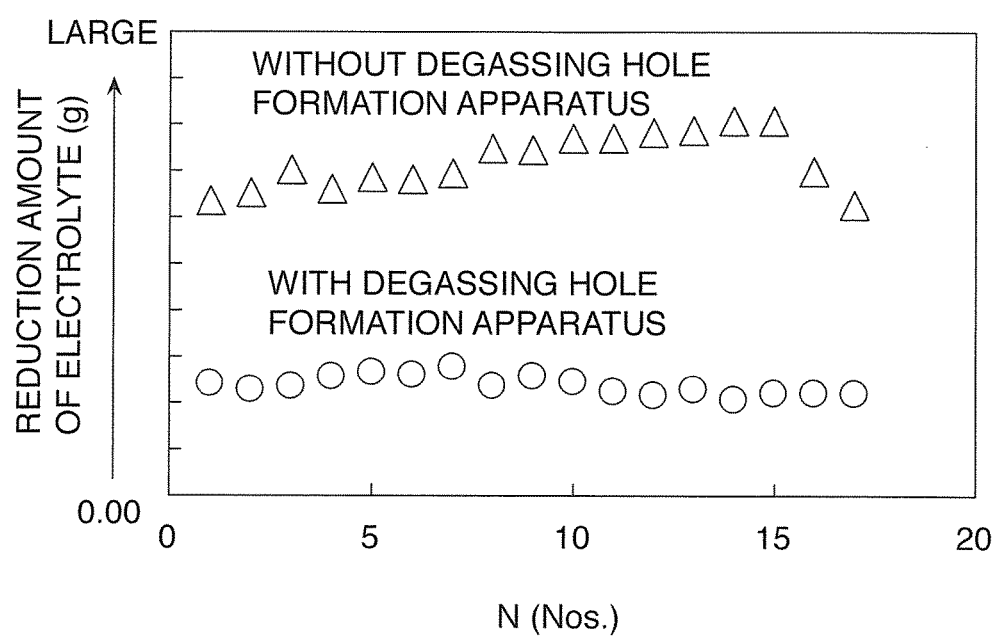
FIG. 12 is a diagram illustrating results of an experiment conducted by the inventors to compare respective reductions in an amount of electrolyte in cases where the degassing hole formation apparatus is and is not used.

Referring to FIG. 12, the inventors compared reductions occurring in the amount of electrolyte in the casing 1 during the operation for forming the degassing hole 5 in the degassing portion 4 using the cutter 14 when a secondary battery manufacturing method using the degassing hole formation apparatus 10 according to this embodiment is employed and when a secondary battery manufacturing method not using the degassing hole formation apparatus 10 according to this embodiment is employed. It was found as a result that with the secondary battery manufacturing method not using the degassing hole formation apparatus 10 according to this embodiment, electrolyte flew out through the degassing hole 5 during formation of the degassing hole 5, leading to a comparatively large reduction in the amount of electrolyte. With this embodiment, on the other hand, in which the degassing hole 5 is formed by the degassing hole formation apparatus 10 after stroking the electrolyte remaining in the degassing portion 4 down to the storage element 2 side, a large reduction in the amount of electrolyte flying out of the casing 1 during formation of the degassing hole 5 was confirmed.

In the embodiment described above, a case in which the degassing hole 5 is formed by inserting a cutout using the cutter 14 in the degassing portion 4 alone was described. However, the range of the cutout may be extended beyond the degassing portion 4 so that the entire length of one side of the casing is cut.

In the above description, it is assumed that the cutter 14 inserts the cutout into the degassing portion 4 after the roller 13 has descended to the lowermost end. However, as long as the roller 13 has passed the through hole 11A in the support member 11, the cutter 14 may start to form the degassing hole 5 as the roller 13 strokes the degassing portion 4 down toward the storage element 2.

In the first embodiment, described above, the support member 11, the roller 13, the moving body 12, and the arm 15 together constitute a clamping mechanism.

Figure 13:
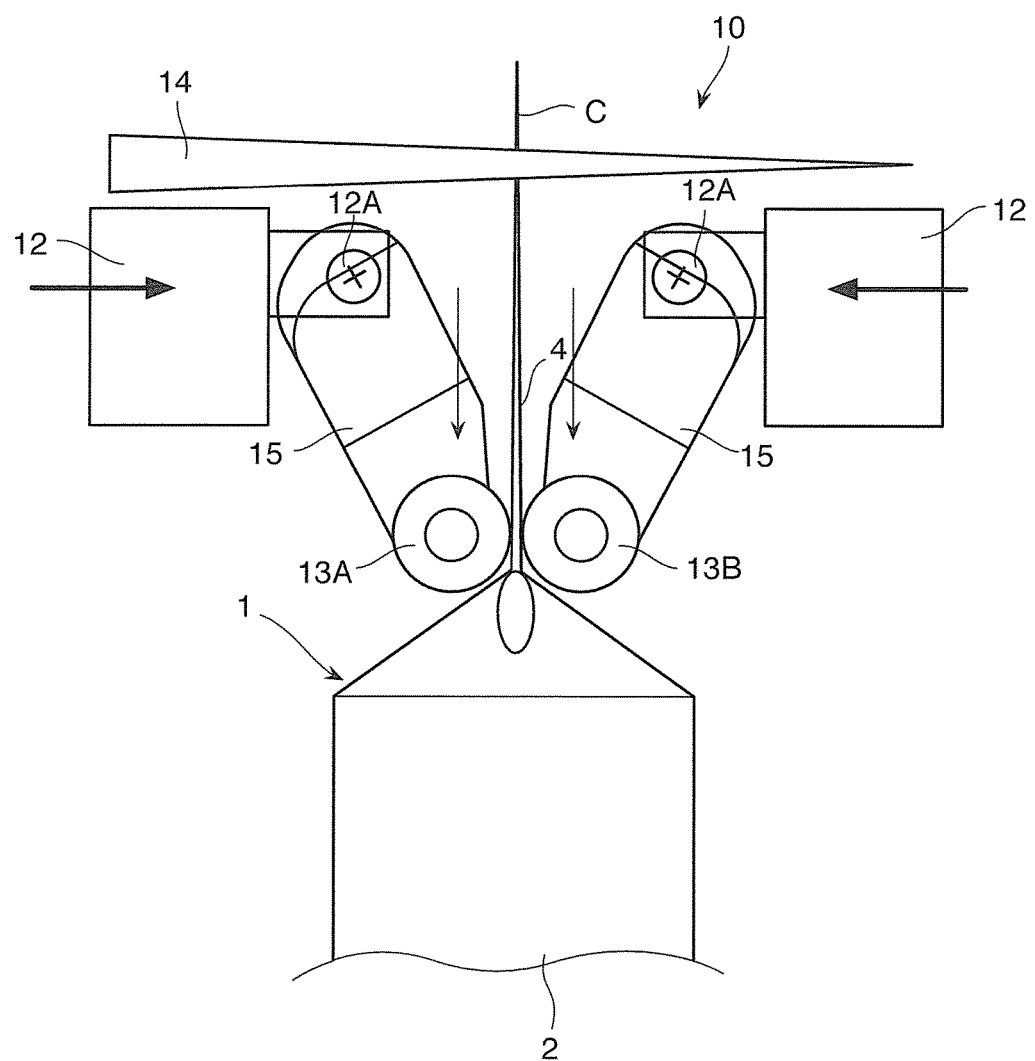
FIG. 13 is a schematic side view of a degassing hole formation apparatus according to a second embodiment of the present invention.

Referring to FIG. 13, a degassing hole formation process and a degassing hole formation apparatus for a secondary battery according to a second embodiment of the present invention will be described.

In the second embodiment, the degassing hole formation apparatus 10 includes a pair of rollers 13A and 13B opposing respective sides of the degassing portion 4 of the casing 1, a pair of moving bodies 12 respectively supporting the rollers 13A and 13B to be free to swing, and the cutter 14, which forms the degassing hole 5 by inserting a cutout into the degassing portion 4. All other configurations are identical to the degassing hole formation apparatus 10 according to the first embodiment.

In the degassing hole formation apparatus 10, the pair of moving bodies 12 are moved to the operating position such that the degassing portion 4 of the casing 1 is clamped by the pair of moving bodies 12. In other words, the rollers 13A and 13B of the respective moving bodies 12 clamp the degassing portion 4 such that the outer covering film of the degassing portion 4 is pressed tightly together, and then stroke the degassing portion 4 downward toward the storage element 2. As a result, the degassing portion 4 is flattened between the pair of rollers 13A and 13B such that the electrolyte remaining in the degassing portion 4 drips down around the periphery of the storage element 2. When the electrolyte that drips down intermixes with the electrolyte on the periphery of the storage element 2, separation of the gas and the electrolyte is promoted.

Likewise in this embodiment, similarly to the first embodiment, the pressing force exerted on the degassing portion 4 by the rollers 13A and 13B during the stroking operation performed by the rollers 13A and 13B on the degassing portion 4 decreases as the rollers 13A, 13B approach the storage element 2. In other words, the rollers 13A, 13B operate so as to press the degassing portion 4 by a comparatively large pressing force when in contact with the casing 1 in a site located far from the storage element 2, and then stroke the degassing portion 4 of the casing 1 downward. As a result, the electrolyte remaining in the degassing portion 4 can be returned reliably to the periphery of the storage element 2 together with the gas intermixed therewith.

Of the pressing force generated in the advancement direction of the moving body 12, the component force that acts on the rollers 13A and 13B via the arm 15 decreases as the incline of the arm 15 relative to the planar direction increases. Accordingly, the pressing force exerted on the degassing portion 4 by the rollers 13A and 13B likewise decreases gradually in accordance with the incline of the arm 15 relative to the planar direction. Hence, as the rollers 13A and 13B are displaced so as to stroke the degassing portion 4 toward the storage element 2, the pressing force exerted on the degassing portion 4 decreases gradually toward the storage element 2. As a result, the electrolyte remaining in the degassing portion 4 can be returned reliably to the periphery of the storage element 2 together with the gas intermixed therewith.

When the rollers 13A and 13B approach the storage element 2 further, the component force that acts on the rollers 13A and 13B via the arm 15, of the pressing force generated in the advancement direction of the moving body 12, decreases further. Accordingly, the pressing force exerted on the degassing portion 4 by the rollers 13A and 13B likewise decreases further. When the rollers 13A and 13B are pressed forcefully against the degassing portion 4 in a site adjacent to the storage element 2, the outer covering film that houses the storage element 2 and is connected to the degassing portion 4 may be pulled, and as a result, the storage element 2 on the inside thereof may be deformed. By further reducing the pressing force of the rollers 13A and 13B in the vicinity of the storage element 2, this problem can be averted.

Following the stroking operation performed by the rollers 13A and 13B on the degassing portion 4, the cutting edge of the cutter 14 advances so as to insert a cutout in the degassing portion 4 of the casing 1. Next, the cutting edge moves in the transverse direction so as to cut open the degassing portion 4 in the transverse direction, and as a result, the degassing hole 5 is formed. After forming the degassing hole 5, the cutter 14 retreats to the standby position. The pair of moving bodies 12 also retreat to their respective standby positions.

Likewise in this embodiment, as described above, the rollers 13A and 13B are displaced while clamping the outer covering film of the degassing portion 4, and therefore the outer covering film is pressed tightly together such that the electrolyte is reliably removed from the degassing portion 4. The degassing hole 5 is formed in the degassing portion 4 after the electrolyte is removed. Hence, similarly to the first embodiment, when the pair of moving bodies 12 retreat to their respective standby positions, the gas in the casing 1 pushes open the degassing portion 4, and is then discharged to the outside of the casing 1 through the degassing hole 5. Meanwhile, as a result of the stroking operation performed by the rollers 13A and 13B, the electrolyte in the degassing portion 4 intermixes with the electrolyte on the periphery of the storage element 2. As a result, a phenomenon whereby electrolyte is discharged to the outside through the degassing portion 4 and the degassing hole 5 during formation of the degassing hole 5 in the degassing portion 4 can be suppressed.

In the second embodiment, described above, the pair of moving bodies 12, the pair of rollers 13A, 13B, and the pair of arms 15 together constitute the clamping mechanism.

Referring to FIGS. 14A-14C, a third embodiment of the present invention will be described.

In this embodiment, the electrolyte remaining in the degassing portion 4 of the casing 1 is pushed back around the periphery of the storage element 2 by clamping the degassing portion 4 using a pair of elastic pads 20 having inclined surfaces.

As shown in FIG. 14A, the pair of elastic pads 20 are constituted by sponge bodies, for example, that oppose the respective sides of the degassing portion 4 of the casing 1 and have mutually opposing inclined surfaces. The figure shows the elastic pads 20 held in the standby position. The elastic pads 20, 20 respectively include inclined surfaces 20A, 20A that approach each other on the peripheral edge of the casing 1 and gradually separate from each other toward the storage element 2. A through hole 20B formed from a transverse direction slit that can be penetrated by the cutter 14 is formed in the center of each elastic pad 20. All other configurations are identical to the first embodiment.

When gas is generated in the casing 1 of the secondary battery during the conditioning process, the internal pressure of the casing 1 is increased by the gas such that electrolyte remains in the degassing portion 4. In the degassing hole formation apparatus 10, as shown in FIG. 14B, the pair of elastic pads 20, 20 advance to the operating position so as to clamp the degassing portion 4 of the casing 1. As the pair of elastic pads 20, 20 advance, the opposing inclined surfaces 20A, 20A initially clamp the degassing portion 4 in a position far from the storage element 2 such that a clamping range widens toward the storage element 2. In other words, the pair of elastic pads 20, 20 perform a stroking operation on the degassing portion 4. As a result, the swollen degassing portion 4 is gradually flattened toward the storage element 2 such that the electrolyte remaining in the degassing portion 4 drips down around the periphery of the storage element 2. The electrolyte that drips down intermixes with the electrolyte on the periphery of the storage element 2, thereby promoting gas-liquid separation between the gas and the electrolyte in the casing 1.

Likewise in this embodiment, a clamping force exerted on the degassing portion 4 by the pair of elastic pads 20, 20 decreases gradually toward the storage element 2. Accordingly, the electrolyte remaining in the site located far from the storage element 2 can be pushed down toward the storage element 2 reliably together with the gas by a powerful clamping force. Meanwhile, the clamping force decreases gradually toward the storage element 2, and therefore a situation in which the outer covering film that houses the storage element 2 and is connected to the degassing portion 4 is pulled by an excessive clamping force such that the storage element 2 on the inside thereof deforms can be averted.

Once the electrolyte and the gas have been removed from the degassing portion 4 in the manner described above, the cutting edge of the cutter 14 advances, as shown in FIG. 14C, so as to insert a cutout in the degassing portion 4 of the casing 1. The cutting edge of the cutter 14 then moves in the transverse direction in order to form the slit-shaped degassing hole 5. After forming the degassing hole 5, the cutter 14 retreats to the standby position. Next, the pair of elastic pads 20, 20 likewise retreat to their respective standby positions.

According to this embodiment, similar effects to those of the first and second embodiments are obtained. Furthermore, according to this embodiment, the configuration of the degassing hole formation apparatus 10 can be simplified in comparison with the first and second embodiments. Moreover, the degassing hole 5 is formed in the degassing portion 4 while holding the degassing portion 4 from either side using the pair of elastic pads 20, 20. Therefore, the position of the degassing portion 4 is stabilized, making it easier to form the degassing hole 5.

In the third embodiment, described above, the pair of elastic pads 20, 20 constitute the clamping mechanism.

Although the invention has been described above with reference to certain embodiments, the invention is not limited to the embodiments described above. Modifications and variations of the embodiments described above will occur to those skilled in the art, within the scope of the claims.

As described above, with the degassing hole formation method and the degassing hole formation apparatus according to the present invention, electrolyte leakage is prevented during manufacture of a secondary battery. Therefore, the present invention brings about a favorable effect in terms of rationalizing a process for manufacturing a secondary battery for an automobile, for example.

The invention claimed is:

1. A degassing hole formation process for a secondary battery manufacturing method, the secondary battery manufacturing method comprising:
   a first sealing process in which outer peripheral edges of overlapped films are joined to form a casing having a joint portion formed on an outer peripheral edge thereof and a storage element is housed in an interior of the casing;
   a degassing process in which gas in the interior of the casing is discharged to an exterior of the casing through a degassing hole; and
   a second sealing process in which the degassing hole is sealed,
   wherein the degassing hole formation process comprises:
      forming the degassing hole in a site located between the joint portion on the outer peripheral edge of the casing and the storage element such that the degassing process is performed through the degassing hole, by pressing a region including the site of the casing in which the degassing hole is formed from respective sides of the casing so that the overlapped films are pressed tightly together gradually in a direction approaching the storage element from a position distant from the storage element while reducing a pressing force gradually toward the storage element, and forming the degassing hole in a pressed region.

2. The degassing hole formation process as defined in claim 1, further comprising:
   supporting one side of the surface of the casing by a restraining pad in the region including the site of the casing in which the degassing hole is formed;
   pressing a roller against another side of the surface on a side far from the storage element so as to exert the pressing force thereon; and
   causing the roller to roll toward a side close to the storage element side while reducing the pressing force gradually as the roller approaches the storage element.

3. The degassing hole formation process as defined in claim 1, further comprising:
   exerting the pressing force by clamping respective sides of the casing in a part far from the storage element using a pair of rollers; and
   causing the rollers to roll toward a side close to the storage element side while reducing the pressing force gradually as the rollers approach the storage element.

4. The degassing hole formation process as defined in claim 1, further comprising:
   exerting the pressing force by clamping the region including the site of the casing in which the degassing hole is formed from respective sides of the surface of the casing using a pair of elastic pads respectively having inclined surfaces that are closer to the surface of the casing in a site located farther from the storage element than a site located nearer to the storage element and gradually separate from the surface of the casing toward the storage element such that the pressing force that decreases gradually toward the storage element.

5. A degassing hole formation apparatus applied to a degassing hole formation process performed by a secondary battery manufacturing apparatus, wherein the secondary battery manufacturing apparatus is configured to perform:
   a first sealing process in which outer peripheral edges of overlapped films are joined to form a casing having a joint portion formed on an outer peripheral edge thereof and a storage element is housed in an interior of the casing; and
   a degassing process in which gas in the interior of the casing is discharged to an exterior of the casing;
   wherein the degassing hole formation apparatus is configured to form a degassing hole in a site located between the joint portion on the outer peripheral edge of the casing and the storage element such that the degassing process is performed through the degassing hole, and
   wherein the degassing hole formation apparatus comprises:
      a pressing device configured to press a region including the site of the casing in which the degassing hole is formed from respective sides of a surface of the casing so that the overlapped films are pressed together gradually in a direction approaching the storage element from a position located at a distance from the storage element while reducing a pressing force gradually toward the storage element; and
      a cutter configured to form the degassing hole in a pressed region.

6. The degassing hole formation apparatus as defined in claim 5, wherein the pressing device comprises:
- a restraining pad configured to support one side of the surface of the casing in the region including the site of the casing in which the degassing hole is formed; and
- a roller configured to exert the pressing force on another side of the surface of the casing while rolling from a side far from the storage element toward a side close to the storage element; and
- wherein the pressing device is configured to reduce the pressing force of the roller gradually toward the storage element.

7. The degassing hole formation apparatus as defined in claim 5, wherein the pressing device comprises:
- a pair of rollers configured to clamp the casing from respective sides of the casing and roll from a side far from the storage element toward a side close to the storage element while exerting the pressing force thereon; and
- wherein the pressing device is configured to reduce the pressing force of the rollers gradually toward the storage element.

8. The degassing hole formation apparatus as defined in claim 5, wherein the pressing device comprises:
- a pair of elastic pads respectively having inclined surfaces that are closer to the surface of the casing in a site located farther from the storage element than in a site located nearer to the storage element and gradually separate from the casing toward the storage element,
- wherein the pressing device is configured to exert the pressing force that decreases gradually toward the storage element by clamping the region including the site of the casing in which the degassing hole is formed from respective sides of the casing using the pair of elastic pads.

* * * * *